No. 12,326. REISSUED MAR. 21, 1905.

S. O. RICHARDSON, Jr.

GLOBE.

APPLICATION FILED JAN. 20, 1905.

Witnesses:
G. V. Domarus.
J. B. Weir

Inventor:
Salon O. Richardson Jr.
by Raymond & Barnett.
Attys

PHOTO-LITHOGRAPHED BY SACHETT & WILHELMS LITHG. & PTG. CO. NEW YORK.

No. 12,326. Reissued March 21, 1905.

UNITED STATES PATENT OFFICE.

SOLON OSMOND RICHARDSON, JR., OF TOLEDO, OHIO.

GLOBE.

SPECIFICATION forming part of Reissued Letters Patent No. 12,326, dated March 21, 1905.

Original No. 777,142, dated December 13, 1904. Application for reissue filed January 20, 1905. Serial No. 242,006.

*To all whom it may concern:*

Be it known that I, SOLON OSMOND RICHARDSON, Jr., a citizen of the United States, residing at Toledo, in the county of Lucas and State of Ohio, have invented certain new and useful Improvements in Globes, of which the following is a specification.

My invention relates especially to improvements in inner globes which are used in electric-arc lamps.

The object of my invention is to provide an inner globe which shall be so constructed that it will not "sag" under the combined influence of the excessive heat (which is sometimes generated by an electric arc, especially when a lamp is working badly) and the weight which rests upon the top of such a globe.

These and such other objects as may hereinafter appear are attained by my invention, the preferred embodiment of which is shown in the devices shown in the accompanying drawings, in which—

Figure 1:
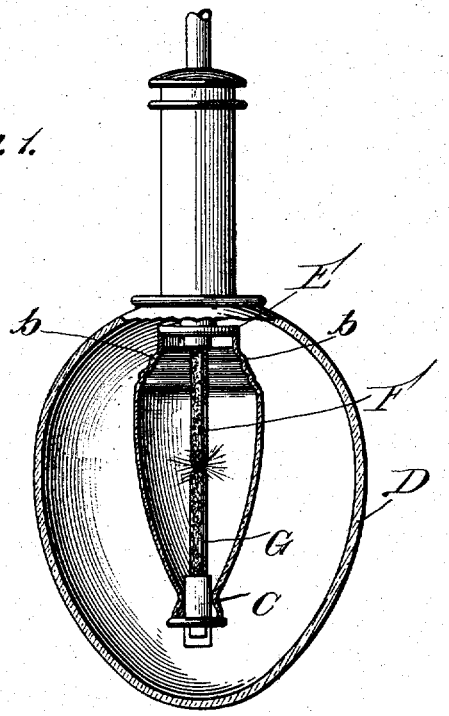
Figure 2:
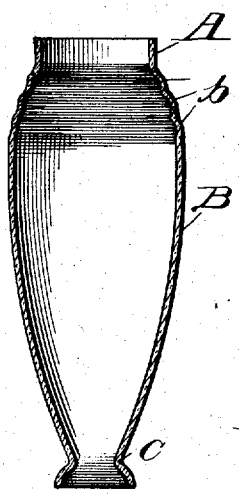
Figure 3:
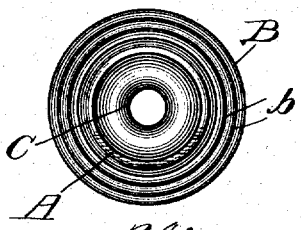
Figure 4:
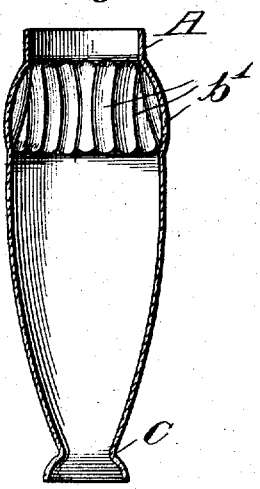
Figure 5:
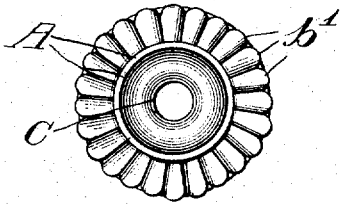

Figure 1 is a view of an arc-lamp with its usual mountings. Fig. 2 is an enlarged vertical section of an inner globe comprising a preferred embodiment of my invention. Fig. 3 is a plan view of said globe. Fig. 4 is a modification thereof, and Fig. 5 is a plan view of Fig. 4.

Like letters of reference indicate the same parts in the several figures of the drawings.

Fig. 2 shows a typical inner globe for arc-lamps comprising the top A, below which the globe swells outwardly into a bulge B and narrows into a neck C.

Referring to Fig. 1, D indicates the outer globe of an arc-lamp, within which is mounted the inner globe. Resting upon the top of the inner globe is the plug E, which carries the upper carbon F. The lower carbon G projects within the inner globe, and the electric arc is formed between the ends of these carbons. The heat generated thereby of course rises within the inner globe.

At times when the light works faultily and a high resistance is produced an excess of heat is generated, which tends to soften the inner globe just below or adjacent to the top A or in the neighborhood of the bulge or shoulder B. Whenever this occurs from any cause, the softening of the glass, combined with the heavy weight of the plug E resting upon the top of the globe, results in a distinct sagging of the globe just below the top A. That this sagging does occur is a matter of common knowledge in this art. By my invention I overcome this sagging by means of corrugations *b b*, which are formed upon the globe adjacent to its top, as shown. Since the overheating of the glass usually occurs at one side or the other instead of all around the top of the globe, the globe usually sags unevenly and at one side. Therefore when such corrugations are formed horizontally, as shown, the corrugations extending from the softened portion of the glass around to the cooler parts of the glass may incidentally afford some purely physical support; but the principal feature of my invention lies in providing, by means of such corrugations, an additional radiating-surface at the location where the globe would otherwise become overheated, and by so providing for a more rapid radiation of heat from this portion of the globe I succeed in keeping the globe sufficiently cool to prevent its softening and sagging. It therefore follows that for the broad purpose of my invention it does not matter whether the radiating-surface is increased by horizontal corrugations *b b*, as in Figs. 2 and 3, or by vertical corrugations *b′ b′*, as in Figs. 4 and 5, or otherwise, the essence of my invention residing in the provision upon the globe of an additional radiating-surface at the location where the globe might otherwise become so overheated as to be softened. That such additional radiating-surface does accomplish the result sought—to wit, keeps the globe sufficiently cool to prevent its softening—and that without such additional radiating-surface the globes will often soften and sag has been fully demonstrated. I therefore do not limit my invention to any of the precise embodiments thereof shown in the accompanying drawings.

It will be noted that, as shown in the drawings, the globe consists of a large body portion which must be of plain symmetrical surface, so as to avoid refraction of the light so far as possible. This body portion tapers downwardly to the narrow neck C and extends outwardly and upwardly into the bulge or shoulder B, which tapers inwardly to the cylindrical top or neck A. This gives a shape admirably adapted to support the weight of the gas-plug, and at the same time I am enabled to provide the desired extra radiating-surface by carrying the globe between the top A and the shoulder B, which part is subjected to the greatest heat without interfering with the free passage of light through the plain body portion of the globe.

While, as above set forth, my invention is especially useful where the globe carries the weight of the gas-plug or similar part, nevertheless it is of value even in those forms of arc-lamps in which the globe does not support such weight, for the heat generated in the manner described and concentrated near the upper part of the globe will frequently cause a sagging of the globe even without the weight of the gas-plug. So, also, while I have shown one typical form of globe for use in such lamps, obviously the contour of the lower part of the globe is immaterial for the purposes of my invention.

I claim—

1. An inner globe for arc-lamps, comprising a plain, vertically-extending rim or top to engage the gas-plug, or other suitable socket, the globe extending downwardly from said top into the body portion, and thence narrowing toward its lower end, said body portion being smooth and plain and said globe being provided with corrugations, immediately below said rim, to provide an increased radiating-surface, substantially as described.

2. An inner globe for arc-lamps, comprising a vertically-extending rim or top adapted to engage the gas-plug, or other suitable socket, the globe swelling out from the lower part of said top to form a shoulder, from which shoulder the body portion extends downwardly, said body portion being smooth and plain and said shoulder being provided with corrugations, immediately below said top, to provide an increased radiating-surface, substantially as described.

3. In an arc-lamp, the combination with the inner globe, of a support therefor, a plug engaging the top of said globe, said globe having a plain, substantially cylindrical rim or top, a swelled portion extending from the lower edge of the top, forming a shoulder, a body portion narrowing downwardly toward the lower end of the globe, said body portion being smooth and plain, and said shoulder being corrugated to provide an increased radiating-surface, substantially as described.

4. In an arc-lamp, the combination with the inner globe, of a support therefor, a plug resting upon and carried by said globe, said globe having a plain, substantially cylindrical rim or top upon which said plug rests, a swelled portion extending from the lower edge of the top forming a shoulder, the body portion tapering downwardly from the shoulder to a narrow neck, said body portion being smooth and plain and said shoulder being corrugated to provide an increased radiating-surface, substantially as described.

SOLON OSMOND RICHARDSON, JR.

Witnesses:

J. H. WRIGHT,

F. E. WOLF.